DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 8

T938,008

BELT STRUCTURE FOR A PNEUMATIC TIRE

Stephen E. Lewis, 417 Brian Drive, Tallmadge, Ohio 44278; Terrance M. Ruip, 1867 Manchester Road, Akron, Ohio 44314; and Michael A. Kolowski, 32 Whitehall Drive, Tallmadge, Ohio 44278

Filed July 12, 1974, Ser. No. 488,608
Int. Cl. B60c *9/18*
U.S. Cl. 152—361 FP
1 Sheet Drawing. 7 Pages Specification

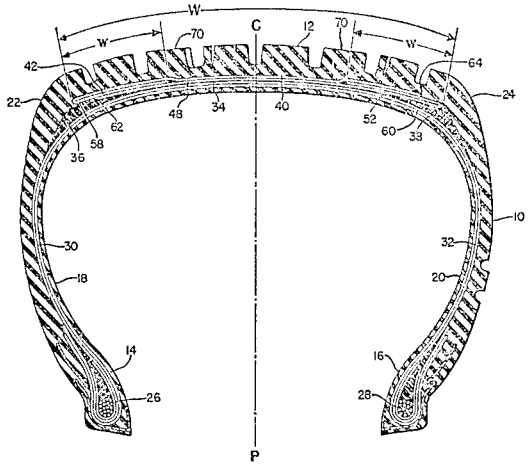

A pneumatic tire provided with a folded belt structure, including two plies of tire cord fabric, the cords of each ply being composed of organic fibers and having a modulus of elasticity of at least 300 grams per denier. One axially outer edge only of each belt ply is reversely folded back upon itself to form a double layer with the double layer of one belt ply being disposed on the axially opposite side of the tire with respect to the double layer of the other belt ply.

The foregoing abstract is not to be taken as limiting the invention of this application, and in order to understand the full nature and extent of the technical disclosure of this application, reference must be made to the accompanying drawing and the following detailed description.

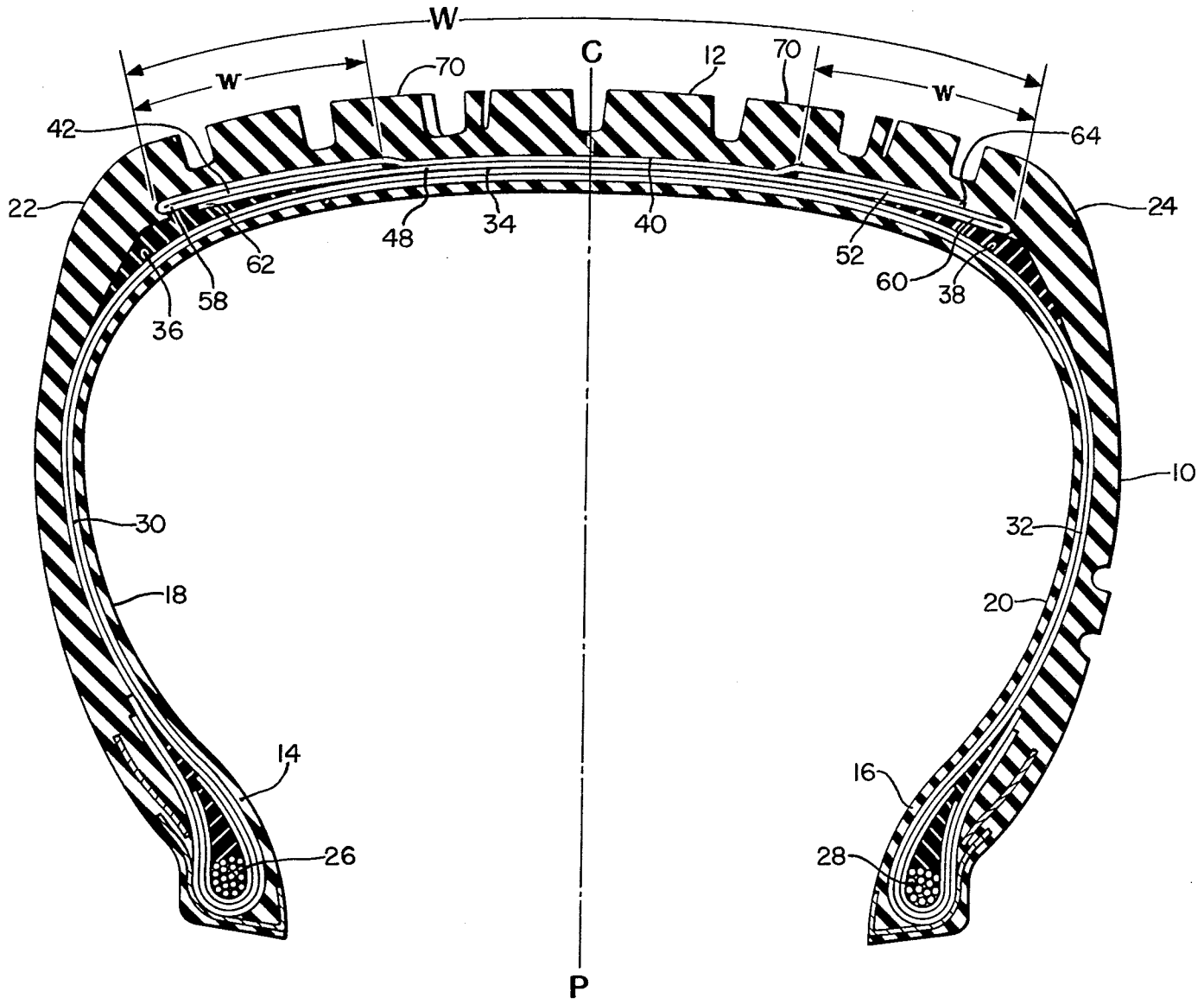

BELT STRUCTURE FOR A PNEUMATIC TIRE
Filed July 12, 1974